United States Patent
Hofmann et al.

[15] 3,688,380
[45] Sept. 5, 1972

[54] MEANS FOR THE CORRECTION OF UNBALANCE IN AN AUTOMOBILE WHEEL

[72] Inventors: Dionys Hofmann, Darmstadt; Dietrich Ende, Onstmettingen, both of Germany

[73] Assignee: Dionys Hofmann Maschinenfabrik, Darmstadt, Germany

[22] Filed: Dec. 1, 1969

[21] Appl. No.: 881,063

[30] Foreign Application Priority Data

Dec. 2, 1968 Germany..........P 18 12 186.3

[52] U.S. Cl. ....................29/243.56, 29/270, 81/310
[51] Int. Cl. ..............................................B23p 11/00
[58] Field of Search........................81/421–426, 303, 81/307, 308, 310; 29/243.56, 270, 278, 254; 269/6; 254/131; 301/5 B

[56] References Cited

UNITED STATES PATENTS

| | | |
|---|---|---|
| 2,600,594 | 6/1952 | Williamson..................81/310 |
| 3,152,391 | 10/1964 | Bjorn et al. .............254/131 X |
| 2,221,747 | 11/1940 | Turner......................301/5 B |
| 2,548,842 | 4/1951 | McRorey..................301/5 B |

*Primary Examiner*—Andrew R. Juhasz
*Assistant Examiner*—Leon Gilden
*Attorney*—Cushman, Darby & Cushman

[57] ABSTRACT

A balance weight for balancing vehicle wheels comprising a weight portion and a separate holding clip which is adapted to engage the weight portion in any of a number of radial positions with respect to the wheel and to also engage a rim flange upon the vehicle wheel to thereby attach the weight portion to the wheel.

A tool is provided for applying the weight to the rim flange which applies diametrically opposed forces to the rim flange and the weight and also applies a third force, perpendicular to the first two forces, which urges the holding clip into the weight portion.

12 Claims, 8 Drawing Figures

3,688,380

INVENTORS
DIONYS HOFMANN
BY DIETRICH ENDE

Cushman, Darby & Cushman
ATTORNEYS

INVENTORS
DIONYS HOFMAN
DIETRICH ENDE

BY Cushman, Darby & Cushman
ATTORNEYS

MEANS FOR THE CORRECTION OF UNBALANCE IN AN AUTOMOBILE WHEEL

The invention relates to means for the correction of unbalance in an automobile wheel, consisting of a weight adapted to the rim flange of the wheel, a holding clip for the weight and a tool which accommodates the holding clip for the purpose of fixing the balance weight on the automobile wheel.

The accurate balancing of vehicle wheels is of great importance for the operation of the vehicle as is known. While an unbalance in the wheel affects primarily the life of the tire, it is resented as well on the steering gear if heavy vibrations develop in certain speed ranges which are annoying not only the driver but subject the components of the steering mechanism to excessive strain and thus cause their early wear.

It is also known that in order to ensure a smooth running, balance weights are applied at the rims of vehicle wheels, these weights generally being made up of a holding clip and a weight firmly combined therewith which are knocked in the rim flange by a hammer blow.

However, difficulties are experienced in the use of balance weights consisting of a weight firmly united with a holding clip if the tire extends far up toward the edge of the rim flange and if the rim flanges show much difference in thickness. In these cases there must be available either a larger assortment of balance weights provided with holding clips suited for the specific thicknesses of the rim flanges or there is a risk that after driving the balance weights on the rims, the initial tension of the holding clip is reduced due to permanent deformations which may have been caused by the drive-on operation to such an extent that the balance weights are not safely located on the rim. Moreover, additional tire compressing means must be used without which the longer branches of the holding clips which are firmly united with the weight pieces, could not be clipped on the rim, this additional length of the clip branches making at least a certain allowance for a varying thickness of the rim flanges.

The difficulties pointed out can be avoided in part by the use of balance weights where the holding clip and the weight piece are not united until being secured on the rim. The standard procedure on this occasion is that after compressing the tire, one branch of the holding clip is pressed against the outside of the rim flange while the other branch of the holding clip is slipped over the weight piece abutting the inside of the rim flange to cause the weight piece to be resiliently pressed against the inside of the rim flange as soon as the holding clip is released.

Certainly, the risk of a deformation of the holding clip is greatly reduced in this way and an added allowance provided for varying thicknesses of the rim flanges. However, in order to achieve the necessary spring tension, the holding clips used must still have such a length that the tire must be compressed now as before.

Another disadvantage for the use of balance weights consisting of two components is that the application of balance weights of this kind causes more difficulty than the application of the single-piece balance weight where the holding clip and the weight piece are firmly combined from the first.

It was now the aim of the invention to propose means with which the difficulties pointed out are overcome and which permits the securing of balance weights on the rims of automobile wheels in an easier and safer way than this has been possible in the past.

This problem is solved by means according to the invention in which the weight piece is provided with a recess in which the relatively short and inflexible holding clip can be radially displaced and fixed in any position, and the tool by producing two opposite force components, on one hand, presses the holding clip against the outside of the rim flange and on the other hand, presses the weight piece against the inside of the rim flange, in which case, after the square abutment of the weight piece and the holding clip on the rim flange, the tool can exert a third force component acting perpendicular on the two other force components on the holding clip to definitively fix the clip in the position it has taken in the recess of the weight piece.

The remaining slight spring action of the holding clip according to the invention now serves just to ensure a square abutment of the weight piece against the inside of the rim flange but is not intended to compensate different thicknesses of rim flanges as is done by the holding clips of the known balance weights.

Means according to the invention are preferably provided at the lower extremity of the holding clip with one or several teeth or similar supporting devices projecting at right angles which can be run into the weight piece of lead. The union of weight and holding clip can further be achieved additionally or only by toothing the edges of the recess for accommodation of the weight and providing the flanks of the holding clip with a matching toothing or by fitting the weight with a pin within the limits of the recess and one branch of the holding clip having an oblong hole extending radially for engagement with the pin. It is favorable preferably in combination with one or several of the hereinbefore described arrangements, if the weight, in addition to the recess for accommodation of the holding clip fitted therein, has ribs or bosses which, after clipping on the weight, are riveted in order to give the union obtained with the holding clip added safety.

According to a preferred embodiment of means according to the invention, the tool has three operating members of which at least two are designed as two-armed levers with common fulcrum and co-operate like pliers in such a manner that the first lever serves to press the weight against the inside of the rim, the second lever serves to press the holding clip against the outside of the rim and the third operating member serves to force portions of the holding clip into the weight.

According to a preferred embodiment of the invention, the third operating member is designed as lever and specifically as a forked, two-armed lever which turns about a pivot fixed in the fore part of the first lever. It has further proved to be of advantage if in order to prevent the pliers from slipping off while pressing on the balance weight, at least one of the levers is provided with a guide member to which is coordinated a corresponding counter member of the balance weight. It has also proved to be advantageous to have the third lever directly act on those points of the holding clip which have attached thereto teeth, barbs, or similar supporting members which must be forced in the weight.

According to another advantageous embodiment of the invention, the third operating member is designed as striker and movably carried in a matching recess of the first lever.

The invention is described and illustrated in an accompanying drawing in which

Figure 1:
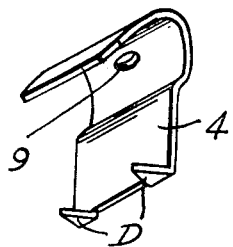
FIGS. 1 to 4 are preferred embodiments of weights and holding clips as essential elements of means according to the invention.
Figure 2:
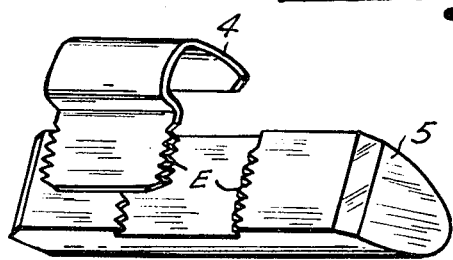
Figure 3:
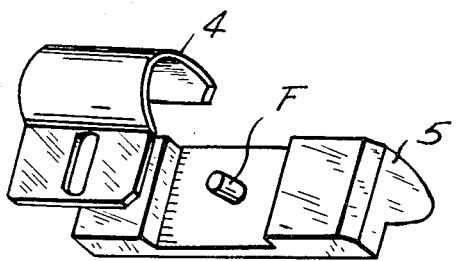
Figure 4:
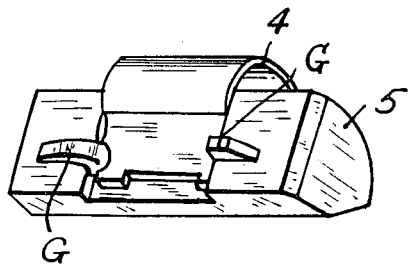

In FIGS. 1 to 4, the reference numeral 4 denotes generally the holding clip and the reference numeral 5 always the weight. A simple and effective union between the weight 5 which usually is of lead, and the holding clip 4 is achieved by providing the lower end of the holding clip with teeth D which are driven in the weight. The weight is equipped with a recess serving as lateral guidance for the holding clip. The union of the holding clip 4 and the weight 5 according to FIG. 1 showing, however, only the holding clip 4, can be completed in that the edges of the recess are provided with a toothing as shown in FIG. 2. Likewise, the lateral edges of the lower part of the holding clip 4 are provided with a toothing which engages with the toothing of the weight as the clip is forced in. Another possibility of the union between the holding clip 4 and the weight 5 that can also be used alone or in combination with the practicable fastening as hereinbefore set forth, consists in a pin F being fitted in the recess of the weight 5 which engages with an oblong hole extending radially in the holding clip 4 and its plain end being beaten down so as to make a solid union. In addition to the arrangements hereinbefore described, it is possible as shown in FIG. 4 to provide the edge of the recess in the weight 5 with lugs or bosses G which after a first fixing of the holding clip 4 in the recess are beaten down in order to improve the union.

Figure 5:
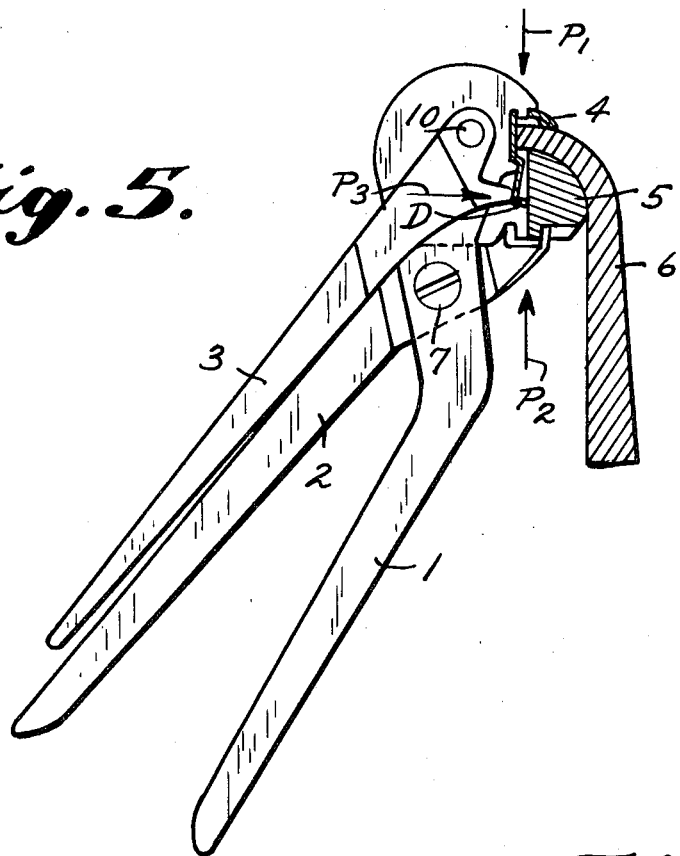
FIG. 5 is a plan view of a tool as essential element of means according to the invention.
Figure 6:
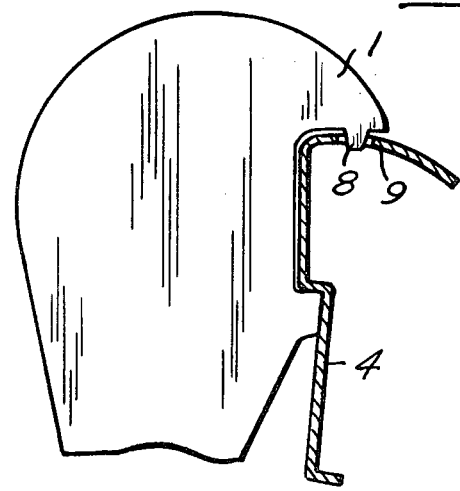
FIG. 6 is a detail of FIG. 5.

FIG. 5 shows all of the three operating means executed as two-armed levers 1, 2 and 3. The lever 1 presses from above against the holding clip 4. The lever 2 presses from below against the weight piece 5 of the balance weight. It will be noted that the actuation of the tool with adequate force causes the weight piece 5 to be pressed against the inside of the rim flange and the holding clip 4 against the outside of the rim flange. The two forces $P_1$ and $P_2$ occurring thereby are exactly opposed each other. Advantageously, the two levers 1 and 2 form self-clamping pliers or so-called lock-grip pliers which are self-locking after being pressed together. After the locking of levers 1 and 2 is made, the lever 3 is operated in the direction indicated by the arrow whereby the holding clip 4 is pressed against the weight piece 5. The third lever 3 acts in this way directly on those points of the holding clip 4 having attached thereto teeth, barbs, or similar supporting members which are consequently forced in the weight. The force $P_3$ exerted by the lever 3 runs at right angles to the two other forces $P_1$ and $P_2$ and causes at the same time the weight 5 to be pressed against the rim. The levers 1 and 2 turn about a common fulcrum which is fixed by the axis 7. In order to prevent the tool from slipping off the elements of the balance weight, the upper end of the lever is provided with a lug 8 which engages with a correspondingly arranged slot 9 in the holding clip 4 as shown in FIG. 6 which is a sectional view of the holding clip 4 as indicated by hatching. It will be noted from FIG. 5 that the weight 5 has likewise a recess which engages with a matching projection on the fore end of the second lever 2. The lever 3 turns about a pivot 10 fixed in the fore part of the lever 1.

Figure 7:
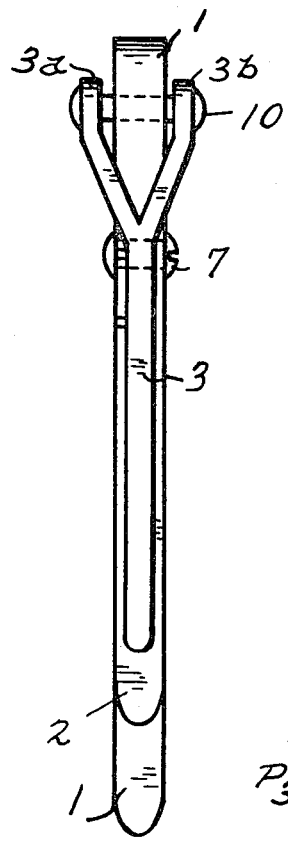
FIG. 7 is a side view of the tool as shown in FIG. 5.

FIG. 7 is a side view of a tool according to the invention as shown in FIG. 5. It can be seen how the third lever 3 in the form of a fork embraces the lever 1 with its forked part and presses with its two fork ends 3a and 3b on the right- and left-hand side of the within lying lever against the holding clip 4 which, however, is not shown in FIG. 7. It is still possible to have the lever 3 non-forked in its fore part defined as the working part and to widen perhaps the region which shall abut against the holding clip 4 in order to achieve in this way that the supporting members of the holding clip are correctly forced in the weight.

Figure 8:
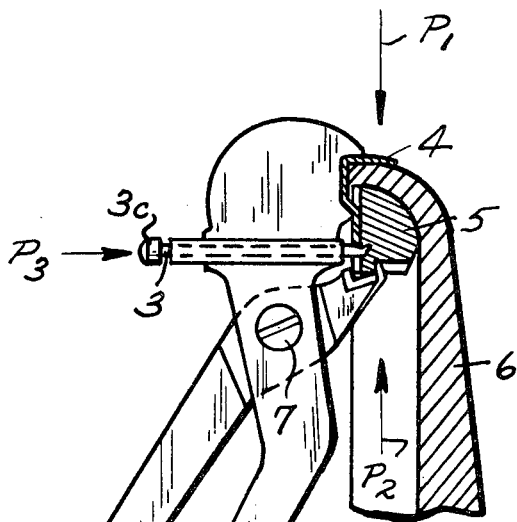
FIG. 8 is a modified embodiment of a tool as essential element of means according to the invention.

A modification of a tool according to the invention is shown in FIG. 8 where the hereinbefore described elements are denoted by the same reference numerals. In contrast with the practical example as represented in FIGS. 5, 6, and 7, the third operating member 3 of the modification is designed as striker which is carried movably in a matching recess of the first lever 1. With this example of the tool, the teeth or barbs of the holding clip 4 are forced in the weight 5 by blows exerted on the head 3c of the third operating member 3 after the holding clip 4 and the weight 5 are pressed against the respective sides of the rim flange.

It is of course within the scope of the invention to give the third operating member 3 a different form in which case it must be assured that the third force $P_3$ acts essentially perpendicular to the two other forces $P_1$ and $P_2$. By way of example, it is conceivable to arrange the third operating member similarly to the striker, but to provide it with a thread and topress it against the holding clip by means of a crank. From the preceding description, it is clear in any case that the tool for the means according to the invention meets in a simple way the requirement to produce the balance weight in one single operation by uniting the weight with the holding clip and to secure it at the same time on the rim of the vehicle wheel.

It is further within the scope of the invention to equip the pliers formed by the two levers 1 and 2 with means for changing the clearance in order to render possible the use of the means according to the invention also on special rims and special weights. Pliers of such a kind are suitable especially also for the application of the balance weights to rims with a circular annular groove. The adequately profiled balance weights for these rims are already given by the annular groove and the pliers serve as in the hereinbefore described cases to impart the holding clip a certain amount of initial stress and to achieve a safe union between the holding clip and the weight piece through the third operating means.

We claim:

1. Apparatus for connection of unbalance in vehicle wheels comprising a weight adapted to conform to the under surface of the rim flange of the vehicle wheel which is to be balanced at an appropriate, predetermined spot, a recess formed within said weight in a radial direction with respect to said wheel, a holding clip having a first portion adapted to engage the upper surface of said rim flange and a second portion adapted to engage the recess portion of said weight by means of supporting members at such a portion along the radial length of said recess that said weight contacts said under surface of said rim, and a first member contacting the upper surface of the holding clip for producing a first force for pressing said holding clip against said upper surface of the rim flange, a second member contacting the bottom of said weight for producing an oppositely directed force, for pressing said weight against said under surface of said rim and a third member contacting the side of said weight for producing a force, perpendicular to the first two forces, for urging said supporting members on said second portion of said holding clip into engagement with said recess portion of said weight.

2. Apparatus as set forth in claim 1, wherein said supporting members comprise at least one tooth of relatively hard material or similar supporting devices projecting at right angles which can be forced into said weight piece which is formed of lead.

3. Apparatus as set forth in claim 1, wherein said weight has a recess with edges which are provided with teeth and said supporting members comprise, flanks of the holding clip which are provided with matching teeth.

4. Apparatus as set forth in claim 1, characterized in that said weight is fitted with a pin within the limits of the recess, and wherein said supporting members comprises that said second portion of the holding clip is provided with a radially extending oblong hole for engagement with the pin.

5. Apparatus as set forth in claim 1, wherein said force producing members comprise a tool which is equipped with three operating members of which at least two are designed as two-armed levers with a common fulcrum and co-operate like pliers in such a manner that the first lever serves to press said weight against the inner surface of the rim, the second lever serves to press the holding clip against the outer surface of the rim, and the third operating member serves to force the second portion of the holding clip into the recess of each weight.

6. Apparatus as set forth in claim 5, wherein the third operating member of the tool is designed as lever.

7. Apparatus as set forth in claim 6, wherein the third operating member of the tool is designed as a forked, two-armed lever which turns about a pivot fixed in the fore part of the first lever.

8. Apparatus as set forth in claim 5, wherein in order to prevent the tool from slipping off while pressing on the balance weight, at least one of the levers is provided with a guide member which cooperates with a corresponding member of the balance weight.

9. Apparatus as set forth in claim 5, wherein the third lever of the tool directly acts on those points of the holding clip which have attached thereto supporting members, and forces them in the weight.

10. Apparatus as set forth in claim 6, wherein the third operating member is widened in its fore region which abuts against the holding clip.

11. Apparatus as set forth in claim 5, wherein the third operating member of the tool is designed as a striker.

12. Apparatus as set forth in claim 11, wherein the striker is movably carried in a matching recess of the first lever.

* * * * *